May 22, 1973    B. S. A. HAMRIN    3,734,987
GEL CAPSULES FOR SMALL UNITS AND METHODS
OF ENCAPSULATING SUCH UNITS
Filed Jan. 22, 1971

United States Patent Office 3,734,987
Patented May 22, 1973

3,734,987
GEL CAPSULES FOR SMALL UNITS AND METHODS OF ENCAPSULATING SUCH UNITS
Bjorn Staffan Artur Hamrin, Bjarred, Sweden, assignor to Aktiebolaget Forenade Superfosfatfabriker, Landskrona, Sweden
Filed Jan. 22, 1971, Ser. No. 108,808
Claims priority, application Sweden, Jan. 29, 1970, 1,096/70
Int. Cl. A01c 1/06; A01n 21/02
U.S. Cl. 264—54                     11 Claims

ABSTRACT OF THE DISCLOSURE

A method of encapsulating small units such as pharmaceutical preparations, seed and the like by a chemical process for obtaining a hollow capsule in which the unit is contained, said capsule preferably being formed of gelatinous matter and inflated by means of a gas generated by a chemical composition covering said unit.

---

This invention relates to a preferably transparent gel capsule for small units and a method of encapsulating such units. It has been known to encapsulate medical preparations in gelatine capsules, either because of the disagreeable taste of the preparation or because the preparation must reach the intestines before taking effect. Such capsules are usually composed of two tubular parts, the ends of which are closed upon insertion of the preparation. Seed is another example of such encapsulated small units, and it has been known to pelletize seed with a mass preferably containing nutrients for the first germination stage of the seed and a protective agent against attack on the seed or the germinating plant. Above all, however, pelletization of seed has been effected to facilitate sowing the seeds one by one to prevent subsequent thinning out, and to facilitate sowing by seed drills.

These methods are entirely mechanical and subject the seed to a considerable amount of wear during pelletization. Moreover, it is known to encapsulate individual seeds within a hollow pellet. Nevertheless, the actual pelletization is carried out by mechanical means, for which reason the seed is still subject to damage during the mechanical processing.

The object of this invention is to provide a chemical method for encapsulating small units which after encapsulation will lie freely within a substantially transparent gelatine casing completely insulating the unit from the atmosphere and being filled with e.g. oxygen gas.

Figure 1:
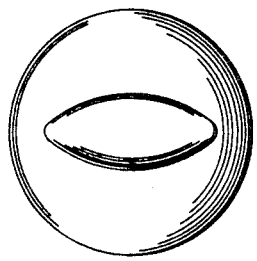
Figure 2:
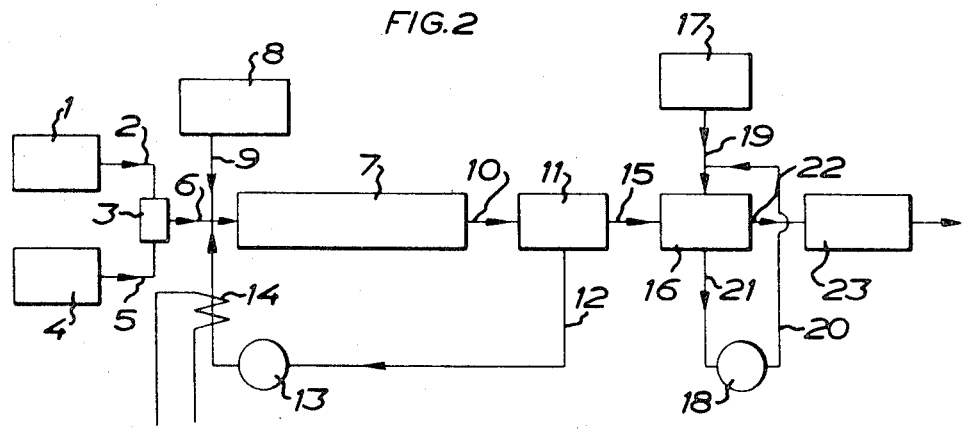

These and other objects of the invention will be described in more detail in the following, reference being had to the accompanying drawing in which:

FIG. 1 shows by way of example a seed enclosed in a capsule made in accordance with the method of this invention, and FIG. 2 is a diagrammatic view of an installation for preparing encapsulated units in a continuous operation.

The invention is described in the following in connection with the encapsulation of seed. However, as has already been pointed out before, also other small units, such as pharmaceutical preparations etc., may be encapsulated by the same method. The practical size of the units to be encapsulated lies between appromixately 10 mm. and 0.1 mm.

The seeds are passed from a container 1 through a conduit 2 to a mixing container 3 which is supplied from a container 4 via a conduit 5 with a mixture of a calcium salt and manganese dioxide. The treated seed mixture is passed from the mixer 3 through a conduit 6 to a rotary reactor 7. At the same time, there is passed to said reactor from a container 8 a solution of gelatine and sodium alginate via a conduit 9. In the reactor 7, the calcium salt from the container 4 reacts with the gelatine and the alginate, thereby surrounding the individual seeds with a spherical gelatine and calcium alginate layer. After the reaction, the seeds thus treated are passed through a conduit 10 to a separator 11 for the liquid which is recycled to the reactor via a return conduit 12 by means of a pump 13, while it is being heated in a heating device 14 to a suitable temperature, for instance 40° C.

The moist seeds 15 are passed from the separator 11 to a second reactor 16 where they are contacted with a solution containing hydrogen peroxide and calcium nitrate supplied from a container 17. This solution is circulated through the reactor by means of a pump 18 via conduits 19, 20 and 21.

When the hydrogen peroxide of the solution comes into contact with the individual seeds, the manganese dioxide adhering to the seeds causes a catalytical decomposition of the hydrogen peroxide, resulting in the formation of a gas bubble around the individual seed, said bubble inflating the gelatine-alginate mixture precipitated around the seed to form a spherical capsule in which the seed is freely movable. The finished seeds are transferred from the reactor 16 to a preferably rotary drying drum 23 where they are dried and, if desired, a plasticizer such as glycerine or polyethylene glycol is added.

The mixture in the container 4 preferably is a relatively difficulty soluble calcium salt, such as lactate, formiate, dihydrogen phosphate, etc. The salt is pulverized to form a flour and mixed with 1–1.5% finely divided manganese dioxide. To cause this powder mixture to adhere to the seeds in the mixer 3 which may be a conventional coating drum, the seeds are moistened in the container. In connection herewith, it is possible to add a minor amount of polyethylene glycol which reduces the formation of dust, and also a minor amount of stearate which facilitates the subsequent separation of the individual seeds.

EXAMPLE

To 1 kg. of carrot seed are added 180 g. of calcium formate and 2 g. of manganese dioxide as well as 25 g. stearate and 30 g. polyethylene glycol. After the seeds have been uniformly coated with this powder mixture in the container 3, they are introduced into the reactor 7 where they are treated with an aqueous solution containing 1% gelatin and 1.5% sodium alginate under agitation for 20 min. The seeds are removed, washed with water and treated with an aqueous solution containing 1% calcium nitrate and 1% hydrogen peroxide in the reactor, whereupon the resulting capsules are dried, and 100 g. polyethylene glycol and 25 g. glycerine are added to them. After drying, 1,600 g. of capsules are obtained, having a size of 3.0–3.5 mm. The capsules are entirely transparent, and each capsule contains but one seed which is freely movable therein, as will be seen from FIG. 1.

The amount of gelatine may vary between 0.5 and 1.3%, and the amount of alginate between 0.6 and 2%. Above and below these limits, the results are not as good.

What I claim and desire to secure by Letters Patent is:

1. A method of encapsulating a seed in a transparent gel capsule which comprises moistening said seed, coating said seed with a precipitation reagent for gelatine and for sodium alginate and with a substance capable of serving as a catalyst for the decomposition of a gas-generating compound, then introducing said coated seed into a first solution containing gelatin and an alginate to precipitate gelatine and the alginate around each unit of the seed, introducing said coated seed into a second solution containing a compound which generates a gas at the surface of the unit of said seed under the action of the said catalyst, whereby the gelatine coat is inflated and a hollow capsule body is formed around each unit of the said seed.

2. A method as claimed in claim 1, wherein the precipitation reagent is a finely pulverized calcium salt.

3. A method as claimed in claim 2, wherein the finely divided calcium salt contains 0.5–2.0% manganese dioxide.

4. A method as claimed in claim 1, wherein the catalyst is finely divided manganese dioxide.

5. A method as claimed in claim 1, wherein the gelatine solution contains gelatine and sodium alginate in a ratio of 1:1.5–1:4.

6. A method as claimed in claim 5, wherein the solution contains 0.5–1.3% gelatine and 0.6–2.0% sodium alginate.

7. A method as claimed in claim 1, wherein said seed is rinsed in water after treatment with the gelatine solution.

8. A method as claimed in claim 1, wherein the second solution contains 0.5–2.0% hydrogen peroxide and 0.5–2.0% calcium nitrate.

9. A method as claimed in claim 1, wherein the seed, while being coated with the precipitation reagent, is coated also with a stearate and polyethylene glycol.

10. A method as claimed in claim 1, wherein the finished capsules are dried.

11. A method according to claim 10 wherein at least one member which is selected from the group consisting of polyethylene glycol and glycerine is added to the finished capsules while they are dried.

References Cited

UNITED STATES PATENTS

| | | | |
|---|---|---|---|
| 2,648,165 | 8/1953 | Nestor | 47—56 |
| 2,989,821 | 6/1961 | Blondheim et al. | 47—57.6 |
| 3,316,676 | 5/1967 | Legal et al. | 47—56 X |
| 3,545,129 | 12/1970 | Schreiber et al. | 47—57.6 |
| 3,561,159 | 2/1971 | Adams | 47—57.6 |
| 3,600,830 | 8/1971 | Hamrin | 47—57.6 |
| 2,570,537 | 10/1951 | Finch | 47—56 UX |

FOREIGN PATENTS

| | | | |
|---|---|---|---|
| 411,040 | 3/1925 | Germany | 47—DIG. 9 |

ROBERT E. BAGWILL, Primary Examiner

U.S. Cl. X.R.

47—57.6; 106—125, 136